(12) United States Patent
Wilsey

(10) Patent No.: US 7,909,370 B1
(45) Date of Patent: Mar. 22, 2011

(54) ROOT-REPELLANT DRAIN/SEWER PIPE CONNECTOR

(76) Inventor: Richard M. Wilsey, Ventura, CA (US)

( * ) Notice: Subject to any disclaimer, the term of this patent is extended or adjusted under 35 U.S.C. 154(b) by 738 days.

(21) Appl. No.: 11/450,256

(22) Filed: Jun. 12, 2006

(51) Int. Cl.
*F16L 21/00* (2006.01)
*E02B 11/00* (2006.01)

(52) U.S. Cl. .......... 285/417; 285/53; 285/235; 285/236; 285/238; 405/47

(58) Field of Classification Search .......... 285/15, 285/53, 235, 236, 238, 248, 369, 398, 417, 285/418; 403/50, 51; 405/47; 464/173–175; 137/15.08, 15.09, 799; 138/96 R, 97, 99, 138/110, 120
See application file for complete search history.

(56) References Cited

U.S. PATENT DOCUMENTS

| | | | | |
|---|---|---|---|---|
| 100,448 A * | 3/1870 | Bird et al | .......... | 285/55 |
| 2,213,946 A * | 9/1940 | Bowen | .......... | 60/587 |
| 2,523,716 A * | 9/1950 | Parr | .......... | 277/605 |
| 2,867,100 A * | 1/1959 | Beecher | .......... | 464/158 |
| 3,122,888 A * | 3/1964 | Boening | .......... | 405/47 |
| 3,219,368 A * | 11/1965 | Crumpler | .......... | 285/287.1 |
| 3,370,615 A * | 2/1968 | Shinzo | .......... | 138/96 R |
| 3,527,484 A * | 9/1970 | Walkden | .......... | 285/236 |
| 3,952,767 A | 4/1976 | Farage | | |
| 4,018,462 A * | 4/1977 | Saka | .......... | 285/111 |
| 4,564,220 A * | 1/1986 | Sills et al. | .......... | 285/236 |
| 5,026,323 A * | 6/1991 | Fukumura et al. | .......... | 464/175 |
| 5,116,414 A | 5/1992 | Burton et al. | | |
| 5,181,952 A | 1/1993 | Burton et al. | | |
| 5,431,458 A * | 7/1995 | Schaub et al. | .......... | 285/236 |
| 5,575,112 A | 11/1996 | Scheubel | | |
| 6,147,029 A | 11/2000 | Bell | | |

\* cited by examiner

*Primary Examiner* — James M Hewitt
*Assistant Examiner* — Jay R Ripley
(74) *Attorney, Agent, or Firm* — J. E. McTaggart

(57) ABSTRACT

A root-repellant underground drain-pipe coupling, which may be made of the same resilient rubber-like material as sleeve-type drain-pipe couplings of known art, is made somewhat longer than conventional coupling sleeves and is fitted internally at each end with a thin collar of root-repelling material such as copper sheet. Each collar is located just inside the outer entrance to the interfacing regions, held in place by a clamp strap around the sleeve, and optionally made with a portion extending outwardly as an extension or flange for purposes of inspection and increased effectiveness.

9 Claims, 2 Drawing Sheets

ROOT-REPELLANT DRAIN/SEWER PIPE CONNECTOR

FIELD OF THE INVENTION

The present invention relates to the field of outdoor drains including sewers and more particularly to prevention of blockage and breakage of underground drain pipes due to invasion by roots of trees and other vegetation

BACKGROUND OF THE INVENTION

Over the many centuries that sewers and other drain pipes have been placed underground, they have been generally subject to ultimate and often premature failure due to blockage and/or damage, incurring heavy ongoing repair costs to homeowners, building owners and public utility agencies. Usually such failure is due to the invasion of roots of trees and other vegetation in a manner that is not generally well understood.

It is a popular misconception that root-related drain-pipe problems are caused by prior failure such as physical damage, e.g. cracked pipes, or faulty workmanship at the joints. Actual experience and testing have shown that roots, in their continuous forward thrust to spread and expand in the relentless search for water, often penetrate conventional drain pipe connectors that were correctly installed and otherwise intact.

This penetration usually leads to actual damage due to expansion of the roots, i.e. cracking, which then accelerates further root invasion, requiring frequent clean-out, and ultimately total blockage requiring costly digging-up and repair/replacement.

DISCUSSION OF KNOWN ART

Such drain-pipe failure is usually found to occur at a joint connected by a conventional sleeve-type pipe coupling, e.g. as normally utilized to connect an ABS (plastic) service line to a clay or old cast iron street drain pipe, and as sometimes utilized between similar pipe ends to facilitate repair and/or partial replacement of a drain service pipe. These conventional couplings cannot withstand the relentless force of root tips which penetrate the "waterproof" interface as hairs less than ⅓ inch long seek and collect water in a spiraling forward thrust of the root tips, creating pressure of expanding cells sufficient to split rock. It has been found that the root tips typically penetrate the interface in an upper region of the pipe and coupling, easily spreading the connector away from the pipe to gain access to the moisture carried inside the pipe, sometimes cracking the pipe and thus accelerating further damage leading to blockage failure as root growth thrives and accumulates inside the pipe.

Whether the pipe material is clay, metal (e.g. cast iron) or modern plastic material such as ABS, whenever similar or dissimilar pipe lines are joined by the known art connectors the connection becomes vulnerable if there are roots present nearby at pipe depth, as the roots proceed in their normal tendency to continuously spread out to great lengths over time.

FIG. 1 is a cross-sectional view of a connector 10 of a well known type that is normally usually utilized to join two dissimilar pipe-ends together, and sometimes used in repair work to join similar pipe ends 14' and 14", as shown, instead of the usual connection where a enlarged sleeve at the end of one pipe slides frictionally onto the regular-sized end of the other pipe. Conventional connector 10 is made with a main sleeve 12 of elastomer material, into which are inserted pipe ends 14' and 14" which may be metal, clay, plastic, concrete or other material. Then at least one stainless steel clamp band 16 tightened onto each of the opposite sleeve-end regions so as to compress the sleeve 12 and make the two interface regions between the two pipe ends and the sleeve interior wall as watertight, airtight and root-resistant as possible. Typically the inside wall of sleeve 12 is configured under the clamp with annular barrier ribs as shown in efforts to enhance the watertightness. However such structure fails to prevent root invasion. Millions of such connectors are in service in sewers and drains; over time, many have failed and will fall upon attack, penetration and invasion by roots of trees or other vegetation.

Known approaches to the problem of root invasion in underground drain pipe lines have included introducing an anti-root or toxic substance either into the ground area external to the pipeline as a preventative measure or internally within the pipeline as a preventive or remedial measure. If not controlled carefully, such methods and substances can damage or destroy the associated trees or vegetation.

U.S. Pat. No. 5,116,414 to Burton et al for LONG-TERM CONTROL OF ROOT GROWTH teaches controlled release of an herbicide such as 2,6-dinitroaniline in a polymer that has the property of preventing root elongation without translocating into other parts of the plant. The herbicide may be encapsulated with the polymer or mixed with it in the form of pellets, sheets, pipe gaskets, pipes for carrying water, or various other forms.

U.S. Pat. No. 5,181,592, also to Burton et al, for a ROOT-GROWTH INHIBITING SHEET discloses a porous sheet material that is provided at intervals with bodies of a polymer which contain a 2,6-dinitroaniline providing a root-repelling property.

U.S. Pat. No. 5,575,112 to Scheubel for a METHOD FOR CONTROLLING THE GROWTH OF PLANT ROOTS uses a water-permeable non-woven fabric of synthetic fibers coated or otherwise impregnated with a water-insoluble polymeric binder in which is dispersed a water-insoluble inorganic copper compound in an amount effective to stop root growth.

U.S. Pat. No. 6,147,0929 to Bell et al for a DISSOLVABLE TABLET THE AUTOMATICALLY DELIVERS NON-TOXIC ROOT INHIBITOR TO DRAIN PIPES teaches delivery of a root-retardant hormone into drain pipes by incorporating the hormone into a tablet that is placed into a drainage system such as a toilet tank, thereby delivering the hormone to the drain pipes each time the toilet is flushed.

U.S. patent to Farage for MEANS FOR TREATING ROOTS ABOUT DRAIN LINES discloses a pipe-line fitting of the clean-out type fitted internally with a suspended container holding crystalline or other dissolvable chemicals such as copper sulphate or the like to be delivered to the interior of the pipeline to repel root intrusion.

These and other know approaches represent affirmative actions to deal with root intrusion before or after the fact, with risk of damage or destruction of the trees or vegetation involved, whereas the present invention provides a solution that can built in as an actual section of a new pipeline or introduced in retrofit, that, once in place, continues to repel roots with no further treatment or replenishment, without risk to the trees or vegetation.

OBJECTS OF THE INVENTION

It is a primary object of the present invention to modify drain pipe couplings of the clamp-on type in a manner to repel invasion by roots, and thus make underground drain pipelines more reliable over longer period of time in service.

It is a further object to select root-repellant material and apply it in a manner that will not damage the associated trees or vegetation.

It is a further object to make the root-repellant pipe coupling low in cost.

It is a further object to make the root-repellant pipe coupling easy to manufacture and distribute.

It is a further object to make the root-repellant pipe coupling essentially as easy to install as known sleeve-type pipe couplings.

SUMMARY OF THE INVENTION

These objects and advantages of the present invention have been accomplished in the present invention wherein a sleeve-type coupling, which may be made of the same resilient rubber-like material as couplings of known art, is made somewhat longer and is fitted internally with one or more thin collars of root-repellant material such as copper. The repellant collars are located in the regions of the outer entrances to the interface at each end of the sleeve, and may be located so that a portion extends outwardly beyond the sleeve end for purposes of inspection and increased effectiveness. The extending portion may be shaped as a flange to facilitate initial positioning of the collar.

It has been proven that copper kills root-tips that come in contact with it; thus nursery pots are sometimes lined with copper-based paint to prevent damage to non-plastic containers and also to keep the roots from the interior walls of these pots.

Copper has been selected as highly suitable for the practice of the invention and is utilized in simple metallic form, rather than in micro nutrient form wherein copper and other substances such as iron, manganese, zinc, boron and chloride are toxic in quantity and could harm or destroy the trees or plants.

Field testing of the connectors of the present invention has shown that root tips will not pass through the interface of the copper linings and thus are prevented from entering into the drain line. It is intended to merely repel the root ends so as to keep them out of the drain pipes, with minimal collateral damage to the roots themselves.

These features and other objects and advantages of the present invention will become apparent from the following more detailed description which, taken in conjunction with the accompanying drawings, illustrates the invention by way of example.

DETAILED DESCRIPTION

Figure 1:
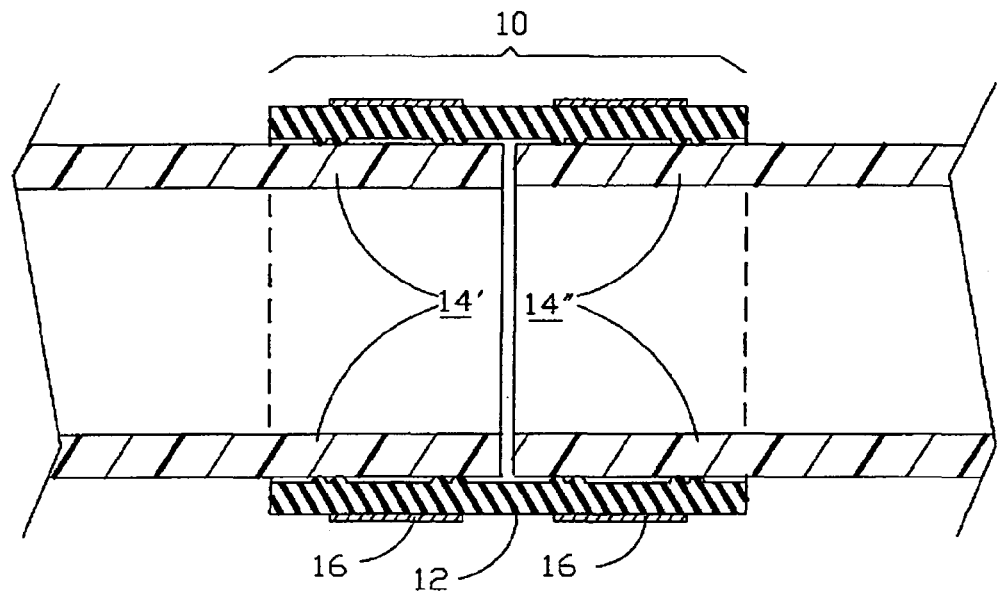
FIG. 1 is a cross-sectional view of a sleeve-type drain pipe connector of known art.

FIG. 1 is a cross-sectional view of a drain pipe connector of known art as discussed above.

Figure 2:
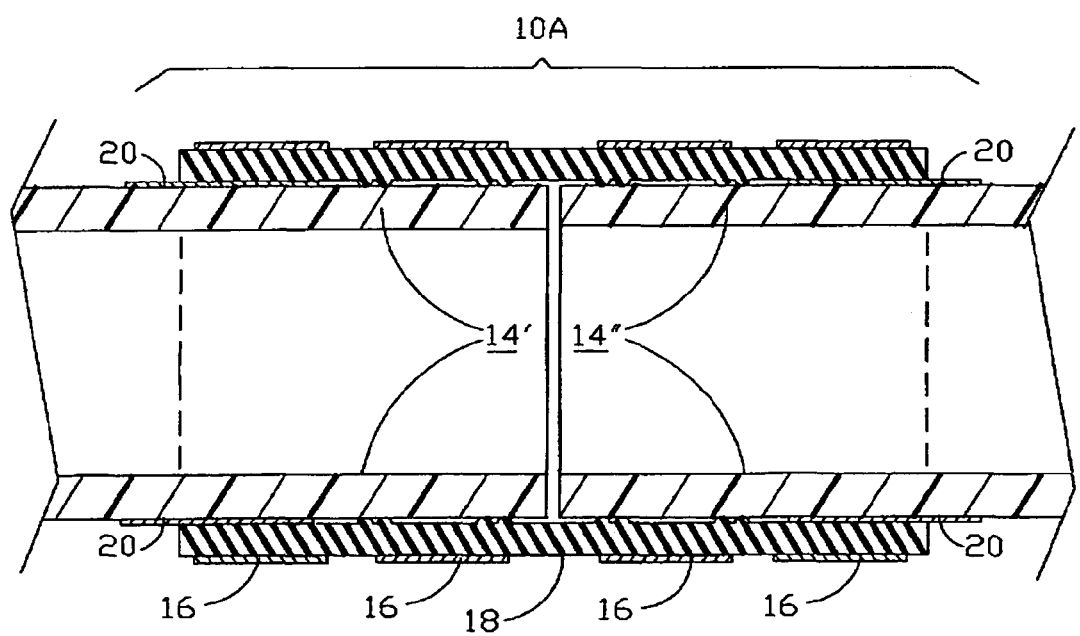
FIG. 2 is a cross-sectional view of a root-repellant drain pipe connector in a first embodiment of the present invention with each repellant collar configured with a tubular extension.

FIG. 2 is a cross-sectional view of a root-repellant drain pipe connector in a first embodiment of the present invention.

As shown in FIG. 2, in a first embodiment of the present invention, novel connector 10A introduces a collar 20 of thin sheet root-repellant material disposed around the inside of each end region of the elastomer sleeve 18, which is made from a synthetic rubber material such as neoprene as found in the conventional sleeve (12, FIG. 1). However, in order to accommodate an additional clamp 16 added at each end to keep the repellant collar 20 in place, sleeve 18 is made substantially longer than the conventional sleeve (FIG. 1). Collar 20 may be formed from an elongate rectangular strip of root-repellant material, e.g. copper shim stock, typically about 1"×13"×0.01" for a 4" pipe, which allows about ½" overlap at the ends. For ease of installation it is preferable for collar 20 to be temporarily held in place by an adhesive prior to inserting the pipes. Alternatively, with the pipes inserted, collar 20, in its initial form as an elongate strip, can be simply wrapped around the pipe, overlapped at the ends, and slid into place in the interface region before tightening the corresponding clamp band 16. It is preferred to allow a small portion of collar 20 to extend beyond the end of sleeve 18 as shown, where the extending end can enhance root-repelling performance by chemical and/or electrolytic reactions with surrounding soil and moisture, and where the extent of such activity can be observed and monitored by removing soil and visually inspecting the exposed ends for evidence of corrosion and depletion due to the sacrificial nature of such reactions. An extra barrier rib can be added around the inside wall of sleeve 18 to serve as a stopper to position collar 20 in place during installation.

Copper in both pure and compound form is well known to repel root growth as well as being durable for long life service underground; thus copper is recommended as a practical and effective material for practice of this invention for preventing pipe coupling failure due to root intrusion. However the invention can be practiced with other metals or materials providing suitable properties, or with composite material such as fabrics treated with appropriate chemical compositions.

Figure 3:
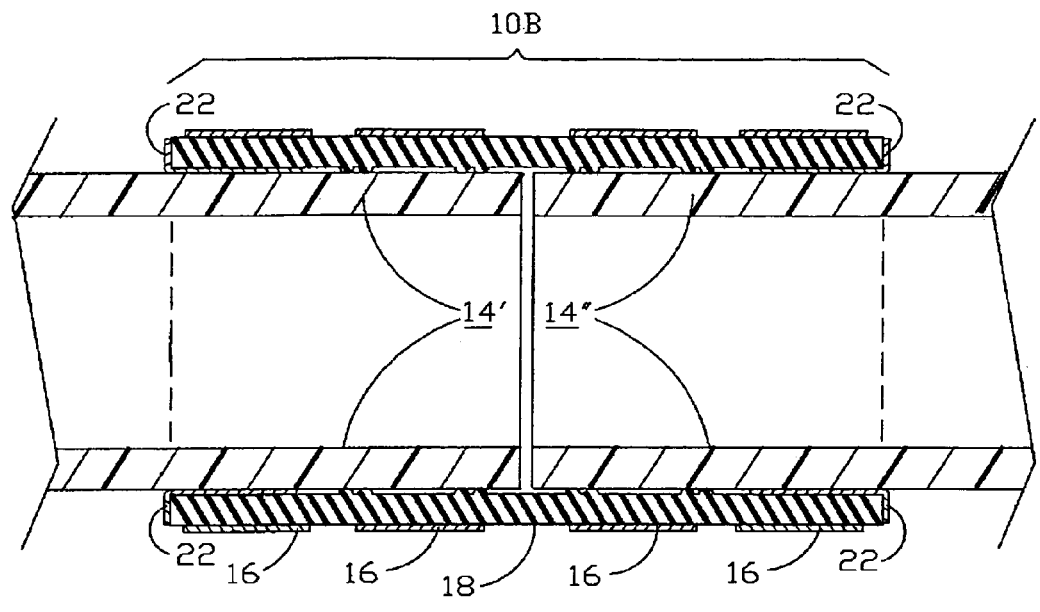
FIG. 3 is a cross-sectional view of a root-repellant drain pipe connector in a second embodiment of the present invention with each repellant collar configured with a flanged extension.

FIG. 3 is a cross-sectional view of a root-repellant drain pipe connector in a second embodiment of the present invention, which utilizes sleeve 18 and clamps 16 as in the first embodiment in FIG. 1, however this second embodiment differs in that each of the two repellant collars 22 is formed with a flange as shown, which automatically positions the collar 22 when inserted initially, eliminating the need to provide a stop ridge inside sleeve 18.

Like the extended portion of collar 20 in FIG. 2, the extending flange portion of collar 22 in FIG. 3 serves to display the presence and the condition of the collar upon later inspection as well as to enhance the repelling of roots.

Figure 4:
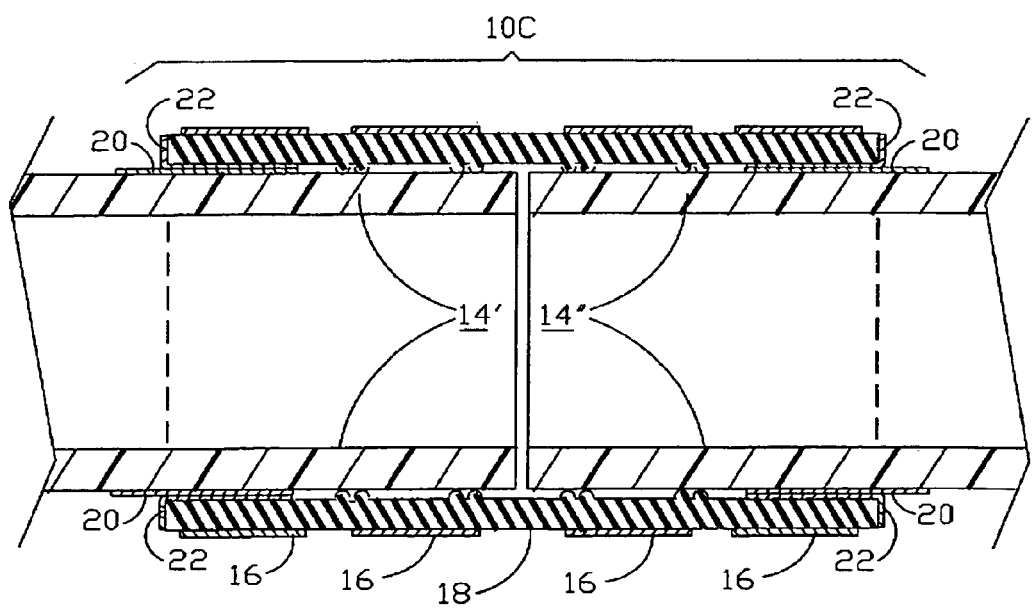

FIG. 4 shows a third embodiment wherein connector 10C surrounds two collars 20 and 22 layered in each of the two locations, with collar 20 forming the inner layer extending in tubular shape as in FIG. 2 and collar 22 forming the outer layer formed with a flange as in FIG. 3.

The principle of the invention could be practiced in other implementations, for example a repellant layer over the entire outside surface of the sleeve-type connector, extending onto and clamped onto the outer surface of the two connected pipes.

In another alternative, the resilient material of the sleeve-type connector itself could be permeated with root-repellant material: this would need to be done in a manner that would not degrade its strength or life expectancy.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A root-repellant sleeve-type drain pipe connector for connecting two co-axial pipe portions facing each other end-to-end in an underground drain pipeline, comprising:

an annular sleeve of resilient material configured in a tubular shape and fitted onto end regions of the two pipe portions;

first compression clamping means for compressing and sealing designated annular regions inside said sleeve against interfacing outer surface regions of each of the two pipe portions in a manner to create and preserve water-tightness of the pipeline; and designated root-repellant material disposed in a manner to repel forward root end growth tending to penetrate interfacing regions between said sleeve and each of the two pipe end regions in respective interface regions thereof;

wherein said designated root-repellant material is configured as two generally tubular collars of thin solid material located, at least in part, in the respective interface regions between the sleeve interior and the respective end exterior regions of the two pipe portions, disposed in opposite end regions of said sleeve, outside the regions compressed by said first compression clamping means;

wherein each collar is disposed in a manner to cause a portion of the collar to extend outwardly beyond the end of said sleeve for inspection purposes.

2. The root-repellant drain pipe connector as defined in claim 1 wherein said first compression clamping means comprises:

at least two annular metal clamping bands surrounding said sleeve, located respectively over the end region of each of the two pipe portions.

3. The root-repellant drain pipe connector as defined in claim 1 further comprising:

second compression clamping means for securing the two tubular collars of thin solid material located between said sleeve interior and the respective end exterior regions of the two pipe portions.

4. The root-repellant drain pipe connector as defined in claim 3 wherein said second compression clamping means comprises:

at least two annular metal clamping bands surrounding said sleeve, located respectively so as to clamp the two collars of root-repellant material in place.

5. The root-repellant drain pipe connector as defined in claim 4 comprising a total of four annular metal clamping bands, two constituting said first clamping means and two constituting said second clamping means.

6. The root-repellant drain pipe connector as defined in claim 2 wherein said collars are configured as two rectangular strips of sheet material each wrapped around a respective pipe end region with a small region of overlap.

7. The root-repellant drain pipe connector as defined in claim 2 wherein said designated root-repellant material is copper in sheet metal form.

8. The root-repellant drain pipe connector as defined in claim 1 wherein each collar is formed with a flange at one edge extending radially outwardly and located at a respective end of said sleeve, exposed for inspection purposes.

9. The root-repellant drain pipe connector as defined in claim 1 further comprising two additional similar collars thus providing an inner layer and an outer layer at each end location, the inner layer being disposed in a manner to extend outwardly beyond the end of said sleeve, and the outer layer being formed with a flange extending radially outwardly at a respective end of said sleeve, thus exposing a portion of each layer for inspection purposes.

* * * * *